US012689821B2

(12) United States Patent
Ragavan et al.

(10) Patent No.:  US 12,689,821 B2
(45) Date of Patent:  Jul. 21, 2026

(54) SEAMLESS SWITCHING OF AUDIO AND/OR VIDEO DEVICES DURING WORKSPACE TRANSITION

(71) Applicant: Dell Products, L.P., Round Rock, TX (US)

(72) Inventors: Srinivasa Ragavan, Bangalore (IN); Vivek Viswanathan Iyer, Saint Johns, FL (US)

(73) Assignee: Dell Products L.P., Round Rock, TX (US)

( * ) Notice: Subject to any disclaimer, the term of this patent is extended or adjusted under 35 U.S.C. 154(b) by 324 days.

(21) Appl. No.: 18/173,375

(22) Filed: Feb. 23, 2023

(65) Prior Publication Data

US 2024/0292092 A1      Aug. 29, 2024

(51) Int. Cl.
*H04N 23/60* (2023.01)
*H04N 23/65* (2023.01)
*H04R 3/00* (2006.01)

(52) U.S. Cl.
CPC ............. *H04N 23/64* (2023.01); *H04N 23/65* (2023.01); *H04R 3/00* (2013.01)

(58) Field of Classification Search
CPC ........... H04N 23/64; H04N 23/65; H04R 3/00
See application file for complete search history.

(56) References Cited

U.S. PATENT DOCUMENTS

| | | | | |
|---|---|---|---|---|
| 6,453,336 B1 * | 9/2002 | Beyda | ................... | H04L 65/403 |
| | | | | 709/224 |
| 9,237,307 B1 * | 1/2016 | Vendrow | ................ | H04N 7/152 |
| 2009/0055911 A1 * | 2/2009 | Hulusi | .................... | H04L 43/50 |
| | | | | 709/224 |
| 2021/0051298 A1 * | 2/2021 | Atkins | ................... | H04N 7/147 |

OTHER PUBLICATIONS

Vivek Viswanathan Iyer et al., "Seamless Switching of Audio and/or Video Devices for Collaboration Application," U.S. Appl. No. 17/805,473, filed Jun. 6, 2022.

* cited by examiner

*Primary Examiner* — Amal S Zenati
(74) *Attorney, Agent, or Firm* — Fogarty LLP

(57) ABSTRACT

Systems and methods for providing seamless switching of audio and/or video devices during workspace state transition are described. In an embodiment, an Information Handling System (IHS) may include a processor and a memory coupled to the processor, the memory having program instructions stored thereon that, upon execution, cause the IHS to: receive, during a collaboration session facilitated by a collaboration application, an indication of a workspace state transition, where the collaboration application is configured to receive audio or video data from an audio or video device via a device handle; and in response to the workspace state transition, map a different audio or video device to the device handle, where the collaboration application is configured to receive additional audio or video data from the different audio or video device via the device handle.

18 Claims, 5 Drawing Sheets

100

SEAMLESS SWITCHING OF AUDIO AND/OR VIDEO DEVICES DURING WORKSPACE TRANSITION

FIELD

This disclosure relates generally to Information Handling Systems, and, more specifically, to systems and methods for providing seamless switching of audio and/or video devices during workspace state transition.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Systems and methods for providing seamless switching of audio and/or video devices during workspace state transition are described. In an illustrative, non-limiting embodiment, an Information Handling System (IHS) may include a processor and a memory coupled to the processor, the memory having program instructions stored thereon that, upon execution, cause the IHS to: receive, during a collaboration session facilitated by a collaboration application, an indication of a workspace state transition, where the collaboration application is configured to receive audio or video data from an audio or video device via a device handle; and in response to the workspace state transition, map a different audio or video device to the device handle, where the collaboration application is configured to receive additional audio or video data from the different audio or video device via the device handle.

The collaboration application may include an audio or video conferencing application. The audio or video device may include at least one of: an integrated camera or an external camera. Additionally, or alternatively, the audio or video device may include at least one of: an integrated microphone, an external microphone, an integrated speaker, or an external speaker. The different audio or video device may be mapped to the device handle by an Operating System (OS) service external to the collaboration application.

In some cases, the different audio or video device may be mapped to the device handle in the absence of notification to the collaboration application. Additionally, or alternatively, the different audio or video device may be mapped to the device handle in the absence of any user input request.

The workspace state transition may include one or more of: opening a lid of the IHS; closing the lid of the IHS; connecting peripherals from the IHS; disconnecting peripherals from the IHS; or a device function failure. The device function failure may include a shutter of a camera being closed during the collaboration session. The program instructions, upon execution, may cause the IHS to select the different audio or video device based, at least in part, upon a user's preference.

The workspace state transition may include an IHS docking or undocking. The workspace state transition may include a at least one of: an unplugging of the audio or video device from the IHS or a plugging of the different audio or video device into the IHS. The workspace state transition may include a power or battery event. The workspace state transition may include a change in utilization of a component of the IHS. The workspace state transition may include at least one of: a change of location of the IHS, a change of position of a user relative to the IHS, a change of position of the user relative to the audio or video device, a change of position of the user relative to the different audio or video device, or a change in the user's gaze or face angle. The workspace state transition may also include a change of a role of a user during the collaboration session.

In another illustrative, non-limiting embodiment, a method may include: receiving an indication of a function failure of an audio or video device during a collaboration session executed by a collaboration application, where the collaboration application is configured to receive audio or video data from the audio or video device using a device handle; and in response to the function failure, mapping a different audio or video device to the device handle without notifying the collaboration application, where the collaboration application is configured to receive additional audio or video data from the different audio or video device using the device handle. The function failure comprises a shutter of a camera being closed during the collaboration session.

In another illustrative, non-limiting embodiment, a memory storage device having program instructions stored thereon that, upon execution by an IHS, cause the IHS to: receive an indication of a workspace state transition during a collaboration session provided by a collaboration application, where the collaboration application is configured to receive audio or video data from an audio or video device using a device handle; and in response to the workspace state transition, map a different audio or video device to the device handle without notification to the collaboration application, where the collaboration application is configured to receive additional audio or video data from the different audio or video device using the device handle. The workspace state transition may include one or more of: docking the IHS; undocking the IHS; opening a lid of the IHS; closing the lid of the IHS; connecting peripherals from the IHS; disconnecting peripherals from the IHS; or a device function failure.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Figure 1:
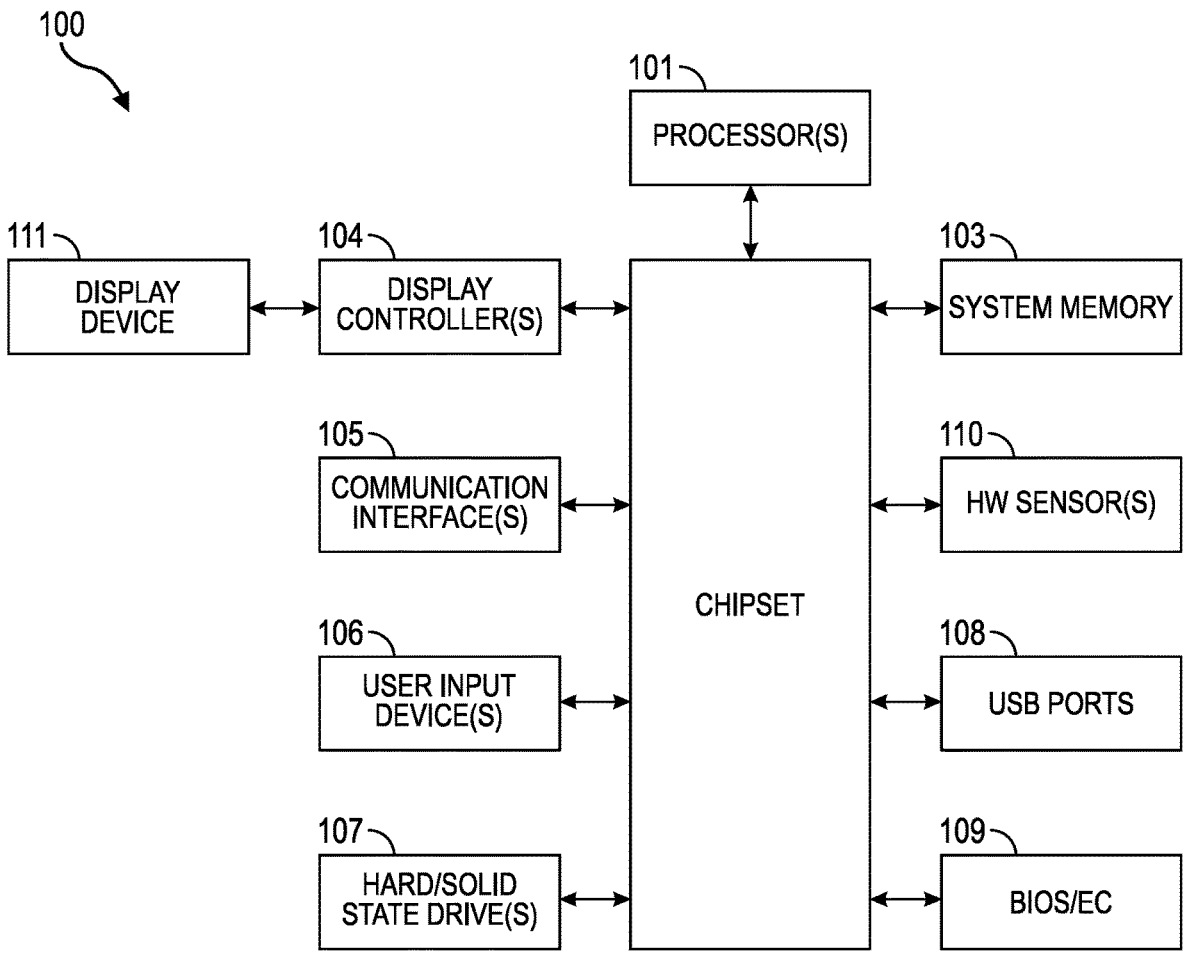
FIG. 1 depicts a block diagram of examples of components of an Information Handling System (IHS), according to some embodiments.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include random access memory (RAM), one or more processing resources such as a central processing unit (CPU) or hardware or software control logic, ROM, and/or other types of nonvolatile memory. Additional components of an IHS may include one or more disk drives, one or more network ports for communicating with external devices as well as various input and output (I/O) devices, such as a keyboard, a mouse, touchscreen and/or a video display. An IHS may also include one or more buses operable to transmit communications between the various hardware components. A more detailed example of an IHS is described with respect to FIG. 1. It should be appreciated that although certain embodiments are discussed in the context of a personal computing device, other embodiments may utilize other types of IHSs.

In modern enterprises, the term "hoteling" (or "office hoteling"), shared workspaces, or co-working spaces collectively refer to physical environments where clients, users, or employees can schedule their hourly, daily, or weekly use of individual spaces, such as office desks, cubicles, or conference rooms-thus serving as an alternative to conventional, permanently assigned seating. In some cases, hoteling clients, users, or employees access a reservation system to book an individual space (e.g., a desk, a cubicle, a conference room, an office, etc.) before they arrive at work, which gives them freedom and flexibility to work wherever they want to. In other cases, individual spaces may also be available to users without a reservation system on a first-come, first-serve basis (e.g., in the lobby of a hotel or in a library).

Each individual space may include its own set of audio and/or video (A/V) peripheral devices (e.g., an external camera or webcam, an external microphone, an external speaker, etc.). When a client, user, or employee reaches an individual space, they bring their own IHSs and choose between using the A/V devices integrated into their IHS or external A/V devices found in that space.

As such, users typically connect to different A/V devices each workday, particularly when executing collaboration applications, such as audio or video conferencing applications (e.g., ZOOM, TEAMS, etc.), or the like. For example, a user may employ a BLUETOOTH (BT) speaker with integrated microphone and webcams when in a home environment, a BT headset with an external webcam in a cubicle environment, or a BT headset with integrated webcam when working from anywhere else. In different work environments, different combinations of devices may be available to the user (e.g., external webcam, integrated webcam, integrated speaker and microphone, external speaker and microphone, wireless headset, etc.).

In some cases, when a client, user, or employee arrives at a particular workspace, their IHS may be coupled to one or more A/V peripheral devices via a Workspace Managing Device (WMD) such as a dock, docking station, intelligent hub, external display, wireless KVM, or other IHS. Additionally, or alternatively, the IHS may be directly coupled to one or more A/V peripheral devices using any suitable wireless communication protocol (e.g., BT, BT LOW ENERGY or "BLE," ZIGBEE, Z-WAVE, WI-FI, WI-FI DIRECT, etc.). Additionally, or alternatively, a workspace may be served by one of a plurality of distributed Access Points (APs) for network/Internet connectivity, such as wireless routers or the like.

In most situations, however, if a user attempts to switch between A/V devices during a collaboration session, whether on purpose or inadvertently (e.g., by docking/undocking in the middle of conference call, IHS lid opening/closing, connecting/disconnecting peripherals from the IHS, camera shutter controls opening/closing), A/V device function failures can lead to undesirable behaviors, such as audio disconnect, video disconnect, call disconnect, video freeze, application freeze, etc. Generally, conventional collaboration applications use a fixed device configuration and do not support seamless switching of A/V devices based upon A/V device function failures, workspace state transistions, and/or user preferences during a collaboration session.

For example, conventional collaboration applications do not allow a user to switch between integrated and external webcams for better video quality (e.g., position, angle, lighting, etc.) or between integrated and external audio devices for better audio quality (e.g., external noise suppression, microphone reception, etc.) during a collaboration session. There is no mechanism to adaptively switch A/V devices based upon a docking or undocking in the middle of conference call, the IHS lid opening or closing, connecting or disconnecting peripherals from the IHS, and/or the camera shutter controls opening or closing. There is also no mechanism to seamlessly switch between A/V devices in response to workspace state transitions, device malfunctions, connectivity issues, or other function failures during a collaboration session.

For example, in a first hypothetical scenario, a user may dock or undock an IHS during a collaboration session. The user may start a video conference call with an integrated webcam and a wireless Bluetooth (BT) headset. During the call, the user docks his laptop into a dock which is connected to an external USB webcam and an HDMI display. The user may wish to switch from the integrated webcam to the external USB webcam connected to the docking station, but leave the audio connected to the wireless Bluetooth headset. However, switching from LTE/5G to a wired docking station, and re-enumerating devices connected behind the dock can take an extended period of time, such as between 60 and 120 seconds. In addition, the collaboration applications can result in unpredictable behaviors such as Audio/Video disconnect, session disconnect, applications entering an unresponsive state and so on.

In a second hypothetical scenario, a user may open or close the lid of the IHS during the collaboration session. The user may start the conference call with an integrated camera and Bluetooth headset while entering office. The user might then dock the IHS device with the IHS lid closed and continue the conference call. The docking station might be connected to an external USB webcam. In a first example, the intended switching might be taking an extended period of time, such as around 30 seconds. Since the external USB webcam might take more time to connect than expected, and so the user might open the lid to the laptop to switch to the integrated camera. In a second example, the user opens the laptop lid to send emails or read documents. The collaboration application detects this action and switches to integrated camera, which is un-intended, resulting in an unintended switching of webcam. In addition, the collaboration applications can result in unpredictable behaviors such as Audio/Video disconnect, session disconnect, applications entering an unresponsive state and so on.

In a third hypothetical scenario, a user sets up specific options for the user's audio and video devices. For example, with regard to an external USB webcam, a user might enable background blur and AI auto framing. For Audio configurations, the user might have a specific audio device preference, and configure the audio levels to be different for different apps, with noise cancellation enabled. In addition, the user might keep on switching the IHS between different states, such as different modern connected standby (MCS) states. However, the configuration for video and audio can be specific to the application and device, and does apply between different states, such as MCS states. Therefore, the user configuration is lost if the device switches states and doesn't always have connectivity to the backend cloud services.

In a fourth hypothetical scenario, a user connects or disconnects peripheral devices and/or reboots the docking station when the device is docked/un-docked. For example, the user may start a conference call at home with his external webcam. In order to commute to work, the user disconnects the external webcam from his IHS and switches to an integrated camera and a Bluetooth headset. When the user arrives at work, the user might dock his IHS device with the IHS lid open at the user's cubicle, and continue his conference call with the same configuration. In addition, the user might hot-plug his external speakerphone into the user's IHS. However, problems can present themselves by the IHS not switching from the integrated camera/integrated audio device to the newly connected better performing audio and webcam devices. In addition, there might be unintended switching to a low performing audio device based on context.

In a fifth hypothetical scenario, a camera shutter might be inadvertently closed as it is being switched to, due to a workspace state transition. For example, a user may start a conference call with his integrated webcam and Bluetooth headset. The user reaches office and docks his IHS device which has an external webcam, which provides better video features, connected to it. However, from the last usage, the external webcam's shutter is still closed, and the user continues the call without noticing that the shutter is closed. Therefore, a problem with this scenario is that the user continues with blank video, since the shutter is closed and no notification is given for the user on the shutter states. The user must manually switch to another webcam or open the shutter.

A sixth hypothetical scenario involves a device capability failure due to hot-plugs or device transitions. For example, a user starts start a video conference call with an external webcam and external speakerphone connected to a docking station on which the user's IHS is docked. During the session, the user might undock the IHS or disconnect the external webcam and/or the external speakerphone, and re-dock or reconnect it within few seconds. Due to a device/firmware failure, the external webcam and/or the external speakerphone gets detected but then the audio or video function fails to get enabled.

With each of these hypothetical scenarios 1-6, the operating system will start detecting the newly connected/disconnected devices connected to the docking station, and the collaboration applications will try to switch to newly connected webcam/audio devices which may result in application/session freeze. Such a freeze can happen for around a minute, in some embodiments. In some of the hypothetical scenarios, it may lead to a longer session/application freeze based on the state of the devices being connected. In addition, with regard to the above hypothetical scenarios 1, 2, 3 and 5, collaboration applications (e.g., Teams/Zoom) may result in un-predictable behaviors such as audio/video disconnect, session disconnect, the applications entering an unresponsive state, video/audio freeze for the meeting participants, and so on.

To address these, and other concerns, systems and methods described herein may enable seamless switching of audio and/or video devices during workspace state transition. In various implementations, these systems and methods may provide an IHS, Operating System or "OS" (e.g., WINDOWS, MACOS, iOS, ANDROID, LINUX, etc.), A/V device, and Independent Software Vendor (ISV)-agnostic architectural framework to handle audio/video seamless consistency and continuity of experiences during IHS/device state transitions, and to ensure a predictable behavior for the user by seamlessly switching to user-preferred devices without affecting ongoing collaboration sessions.

These systems and methods may include a peripheral event module, a virtual camera driver, virtual camera control points, and an A/V shim layer that handles device function failures and transitions of AV devices seamlessly. A shim can be a library that transparently intercepts API calls and changes the arguments passed, handles the operation itself, or redirects the operation elsewhere. The A/V shim layer may monitor and detect device function failures or device switching, and it may switch and associate appropriate physical A/V devices with corresponding virtual handles, thereby ensuring a seamless transition without collaboration applications having to be made aware of the function failures or context changes. As such, these systems and methods enable predictable behavior and allow users to have seamless switching of A/V devices during a workspace state transition without otherwise burdening the session.

FIG. 1 is a block diagram of components of IHS 100, according to some embodiments. As depicted, IHS 100 includes processor 101. In various embodiments, IHS 100 may be a single-processor system, or a multi-processor system including two or more processors. Processor 101 may include any processor capable of executing program instructions, such as a PENTIUM series processor, or any general-purpose or embedded processors implementing any of a variety of Instruction Set Architectures (ISAs), such as an x86 ISA or a Reduced Instruction Set Computer (RISC) ISA (e.g., POWERPC, ARM, SPARC, MIPS, etc.).

IHS 100 includes chipset 102 coupled to processor 101. Chipset 102 may provide processor 101 with access to several resources. In some cases, chipset 102 may utilize a QuickPath Interconnect (QPI) bus to communicate with processor 101. Chipset 102 may also be coupled to communication interface(s) 105 to enable communications between IHS 100 and various wired and/or wireless networks, such as Ethernet, WiFi, BT, cellular or mobile networks (e.g., CDMA, TDMA, LTE, etc.), satellite networks, or the like. In some cases, communication interface(s) 105 may be used to communicate with A/V devices (e.g., BT speakers, microphones, headsets, etc.). Moreover, communication interface(s) 105 may be coupled to chipset 102 via a PCIe bus.

Chipset 102 may be coupled to display controller(s) 104, which may include one or more or graphics processor(s) (GPUs) on a graphics bus, such as an Accelerated Graphics Port (AGP) or Peripheral Component Interconnect Express (PCIe) bus. As shown, display controller(s) 104 provide video or display signals to display device 111. In other implementations, any number of display controllers or display devices may be used.

Display device 111 may include Liquid Crystal Display (LCD), Light Emitting Diode (LED), organic LED (OLED), or other thin film display technologies. Display device 111 may include a plurality of pixels arranged in a matrix, configured to display visual information, such as text, two-dimensional images, video, three-dimensional images, etc. In some cases, display device 111 may be provided as a single continuous display, rather than two discrete displays.

Chipset 102 may provide processor 101 and/or display controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a solid-state drive (SSD) or the like. Memory 103 may store program instructions that, upon execution by processor 101, enable a collaboration mode for a touchpad coupled or integrated into IHS 100.

Chipset 102 may also provide access to one or more hard disk and/or solid-state drives 107. In certain embodiments, chipset 102 may also provide access to one or more optical drives or other removable-media drives. In certain embodiments, chipset 102 may also provide access to one or more USB ports 108, to which one or more A/V peripheral devices may be coupled (e.g., internal or external webcams, microphones, speakers, etc.).

Chipset 102 may further provide access to one or more user input devices 106, for example, using a super I/O controller or the like. Examples of user input devices 106 include, but are not limited to, a keyboard, mouse, touchpad, stylus or active pen, totem, etc. Each of user input devices 106 may include a respective controller (e.g., a touchpad may have its own touchpad controller) that interfaces with chipset 102 through a wired or wireless connection (e.g., via communication interfaces(s) 105).

In certain embodiments, chipset 102 may also provide an interface for communications with one or more hardware (HW) sensors 110. Sensors 110 may be disposed on or within the chassis of IHS 100, and may include, but are not limited to: electric, magnetic, radio, optical, infrared, thermal, force, pressure, acoustic, ultrasonic, proximity, position, deformation, bending, direction, movement, velocity, rotation, and/or acceleration sensor(s).

Upon booting of IHS 100, processor(s) 101 may utilize Basic Input/Output System (BIOS) instructions of BIOS/ Embedded Controller (EC) 109 to initialize and test hardware components coupled to IHS 100 and to load an OS for use by IHS 100. BIOS 109 provides an abstraction layer that allows the OS to interface with certain hardware components that are utilized by IHS 100. Via the hardware abstraction layer provided by BIOS 109, software stored in system memory 103 and executed by processor 101 can interface with certain I/O devices that are coupled to IHS 100. The Unified Extensible Firmware Interface (UEFI) was designed as a successor to BIOS. As a result, many modern IHSs utilize UEFI in addition to or instead of a BIOS. As used herein, BIOS 109 is intended to also encompass a UEFI component.

EC 109 may be installed as a Trusted Execution Environment (TEE) component to the motherboard of IHS 100. EC 109 may implement operations for interfacing with a power adapter in managing power for IHS 100. Such operations may be utilized to determine the power status of IHS 100, such as whether IHS 100 is operating from battery power or is plugged into an AC power source. Firmware instructions utilized by EC 109 may be used to provide various core operations of IHS 100, such as power management and management of certain modes of IHS 100 (e.g., turbo modes, maximum operating clock frequencies of certain components, etc.).

In some implementations, a low-power mode of operation may include the S0 low-power idle model, also known as Modern Standby or Connected Standby, which provides an instant on/off user experience and maintains a network connection for certain processes while consuming very little power. These power modes may be entered, for example, when IHS 100 transitions into standby (e.g., "sleep," etc.).

EC 109 may also implement operations for detecting certain changes to the physical configuration or posture of IHS 100 and managing the modes of a touchpad or other user input device 106 in different configurations of IHS 100. For instance, where IHS 100 as a 2-in-1 laptop/tablet form factor, EC 109 may receive inputs from a lid position or hinge angle sensor 110, and it may use those inputs to determine: whether the two sides of IHS 100 have been latched together to a closed position or a tablet position, the magnitude of a hinge or lid angle, etc.

EC 109 may be further configured to calculate hashes or signatures that uniquely identify individual components of IHS 100. In such scenarios, EC 109 may calculate a hash value based on the configuration of a hardware and/or software component coupled to IHS 100. For instance, EC 109 may calculate a hash value based on all firmware and other code or settings stored in an onboard memory of a hardware component. Such hash values may be calculated as part of a trusted process of manufacturing IHS 100 and may be maintained in secure storage as a reference signature. EC 109 may later recalculate the hash value for a component may compare it against the reference hash value to determine if any modifications have been made to the component, thus indicating that the component has been compromised. In this manner, EC 109 may validate the integrity of hardware and software components installed on IHS 100.

In other embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components. For example, all or a portion of the operations executed by the illustrated components may instead be provided by components integrated into processor(s) 101 as systems-on-a-chip (SoC). As such, in certain embodiments, IHS 100 may be implemented as different classes of computing devices including, but not limited to: servers, workstations, desktops, laptops, appliances, video game consoles, tablets, smartphones, etc.

Figure 2:
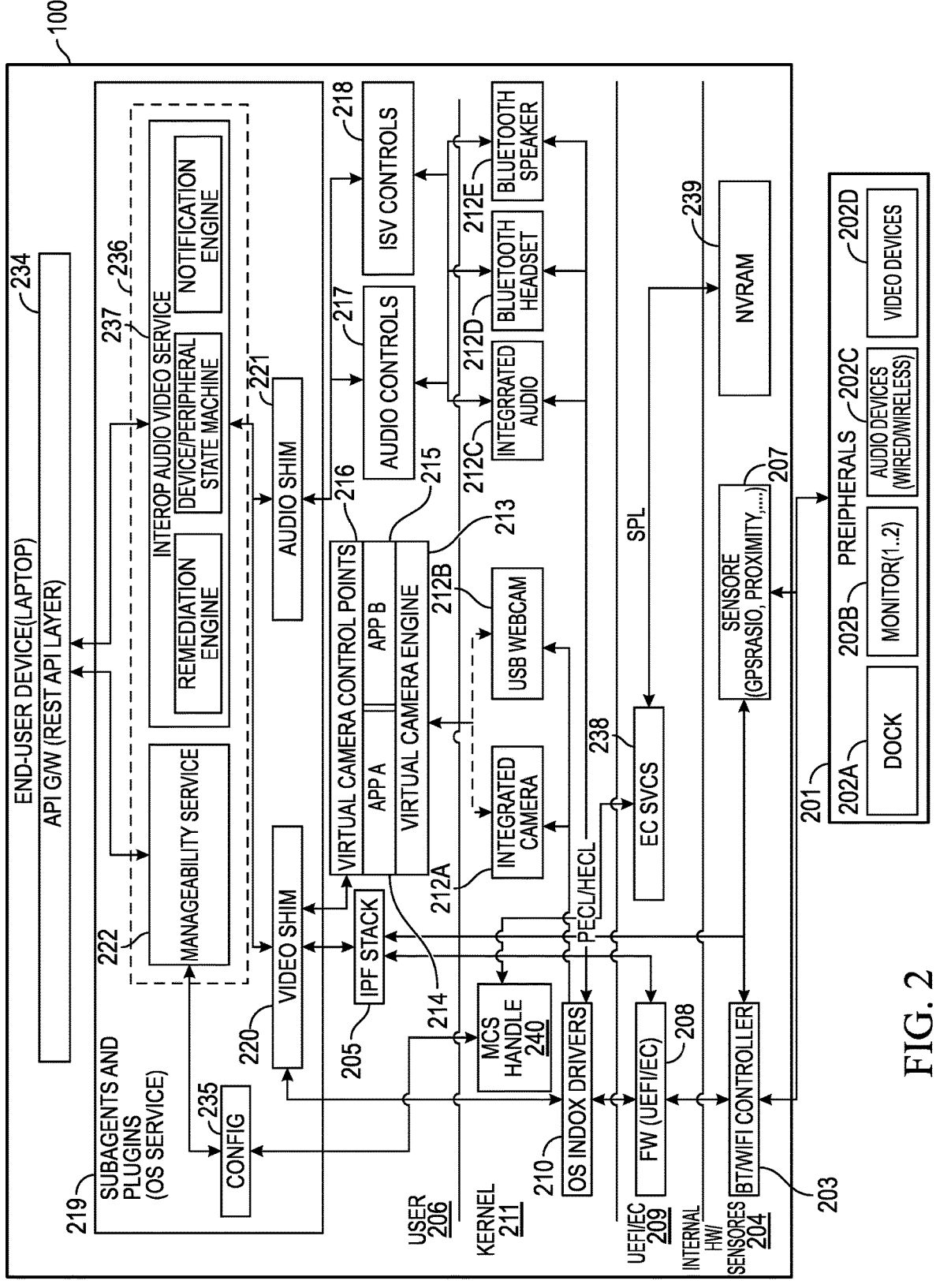
FIG. 2 depicts a block diagram of an example of a system for providing seamless switching of audio and/or video (A/V) devices during workspace state transition, according to some embodiments.

FIG. 2 depicts a block diagram of an example of a system for providing seamless switching of A/V devices during workspace state transition, according to some embodiments. Particularly, as shown in FIG. 2, IHS 100 may be disposed in a workspace (the user's home, a shared workspace, a cubicle, a desk, a conference room, a coffee shop, etc.) where physical peripheral devices 201 are available, including dock 202A, monitor 202B, audio devices 202C (e.g., USB or wireless microphone or speakers), and video devices 202D (e.g., USB or wireless webcam). In some cases, IHS 100 may be coupled to one or more peripheral devices 201 via dock 202A.

System components of IHS 100 are divided into hardware/sensor layer 204, UEFI/EC layer 209, kernel space 211, and user space 206. Particularly, BT/WiFi controller 203 of layer 204 and sensors 207 (e.g., HW sensors 110 in FIG. 1) are coupled to platform framework (IPF) stack 205 in user space 206. Firmware (FW) 208 of UEFI/EC layer 209 is coupled to BT/WiFi controller 203 in hardware/sensor layer 204, OS inbox drivers 210 in kernel space 211, and IPF stack 205 in user space 206.

OS drivers 210 are coupled to integrated camera driver 212A, USB webcam camera driver 212B, integrated audio driver 212C, BT headset driver 212D, and BT speaker 212E. Integrated camera driver 212A and USB camera driver 212B are coupled to virtual camera engine 213 in user space 206, and integrated audio driver 212C, BT headset driver 212D, and BT speaker 212E are coupled to audio control module 217 and ISV control module 218 in user space 206.

Virtual camera engine 213 is coupled to first application 214 (e.g., ZOOM) and second application 215 (e.g., TEAMS). It should be noted, however, that any number of applications may be executed in user space 206. Each of applications 214 and 215 is coupled to virtual camera control points 216.

Subagents and plugins section of the OS service 219 includes a manageability service 222 and an interop A/V service 237. The interop A/V service 237 contains subcomponents of a remediation engine, a device/peripheral state machine, and a notification engine. Moreover, interop A/V service 237 is coupled to video shim 220 and audio shim 221. Video shim 220 is coupled to the OS drivers 210, the platform framework (IPF) stack 205, and to virtual camera control points 216. Audio shim 221 is coupled to audio control module 217 and ISV control module 218. Furthermore, manageability service 222 and interop A/V service 237 may be in communication with cloud services (not shown) via gateway Application Programming Interface (API) 234 (e.g., a representational state transfer or "REST" API).

The manageability service 222 is connected to a config component 235, which captures a current state in which audio/video devices are running. For example, the config component 235 captures a specific external connected webcam and an external speakerphone might be a preferred A/V devices. The config component 235 captures the preferred A/V devices along with the A/V device configurations as well. The config component 235 is connected to an IHS state handler, such as a modern connected standby (MCS) handle

240 in the kernel space 211. The config component 235 backs up the captured current states, including the preferred devices and device configurations, using the IHS state handler 240. The IHS state handler 240 is connected to a BIOS/Embedded Controller (EC) services (Svcs) 238 component, which is connected to non-volatile memory 239, such as non-volatile RAM (NVRAM) 239. The preferred configurations are stored into the non-volatile memory 239, through the EC Svcs component 238. Therefore, when the state of the IHS returns to an active state from a shutdown, sleep, or hibernate state, the backed up captured current states, including the preferred devices and device configurations, are replaced back to the workspace.

In operation, interop A/V service 237 is configured to monitor, capture, and configure A/V devices based on a user's current context. The remediation engine of the interop A/V service 237 defines remediations for A/V devices. For example, the remediation engine can determine the next preferred A/V device to switch to, if a current device fails or becomes disconnected. The device/peripheral state machine of the interop A/V service 237 detects different state transition events, and can trigger remedial actions implemented by the remediation engine or the notification engine of the interop A/V service 237. For example, if there is a state transition, such as a device going from a connected to disconnected state, or a device going from a working to a non-working state, or a peripheral becoming newly connected to the workspace, the device/peripheral state machine can capture the state transitions. The interop A/V service 237 can then configure A/V devices through the video and audio shims (220, 221).

The video shim 220 comprises a library layer configured to abstract, generalize, and/or normalize different video frameworks and/or modules, and to provide a single video configuration API. Conversely, audio shim 221 comprises a library layer configured to abstract, generalize, or normalize different audio frameworks and/or modules, and to provide a single audio configuration API. Meanwhile, gateway API 234 is responsible for exposing A/V preset configurations from the edge, and acts as a gateway for outgoing requests. Virtual camera control points 216 enable virtual device (e.g., camera) controls for configuring audio and video settings.

The notification engine of the interop A/V service 237 is configured to notify the user in certain situations. For example, if the interop A/V service 237 is not able to switch to a preferred device, then the notification engine can notify the end-user of such. The notification engine can inform the user, for example, that a state transition has happened, and certain capabilities might be lost for the time being, but once the devices are back in the workspace, then the end user will have those devices at full capability.

Figure 3:
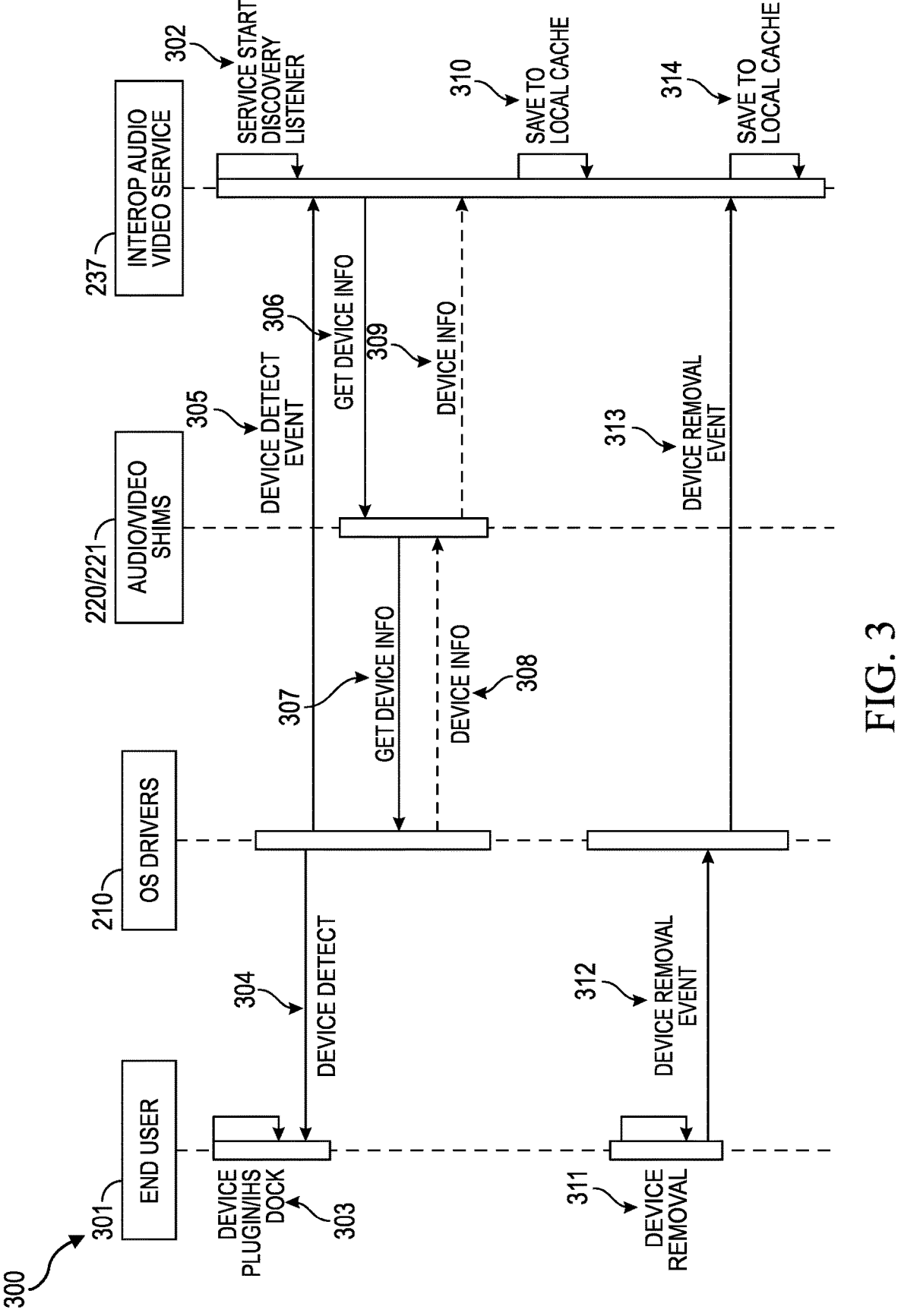
FIG. 3 depicts a sequence diagram of an example of a method for A/V device discovery and cache update, according to some embodiments.

FIG. 3 depicts a sequence diagram of an example of method 300 for A/V device discovery and cache update. In various embodiments, method 300 may be performed, at least in part, by one or more components shown in the system of FIG. 2. Particularly, at 302, interop A/V service 237 starts a discovery listening service. At 303, user 301 plugs an A/V device into IHS 100 (e.g., by plugging IHS 100 into dock 201A, wiring an external device into IHS 100, wirelessly pairing a device to IHS 100, etc.).

At 304, OS drivers 210 detect the newly added A/V device. At 305, OS drivers 210 issue a "device detect" event message to interop A/V service 237. At 306, interop A/V service 237 sends A/V shims 220/221 a "get device information" command. At 307, A/V shims 220/221 send the get device information command to OS drivers 210. At 308, OS drivers 210 send the obtained device information (e.g., vendor, Device ID, asset information, etc.) to A/V shims 220/221, and at 309 A/V shims 220/221 forward the device information to interop A/V service 237. At 310, interop A/V service 237 saves the newly added A/V device information to a local cache.

At 311, an A/V device removal event may occur (e.g., by unplugging IHS 100 from dock 201A, unplugging an external device from IHS 100, wirelessly disconnecting a device from IHS 100, suffering a power outage, reaching a low battery charge level, etc.). As such, at 312, the A/V device removal event may be detected by OS drivers 210. At 313, OS drivers 210 may send an indication of the A/V device removal event to interop A/V service 237. Then, at 314, interop A/V service 237 may update the local cache by flagging a corresponding A/V device as unavailable or by removing the device information from the cache.

Figure 4:
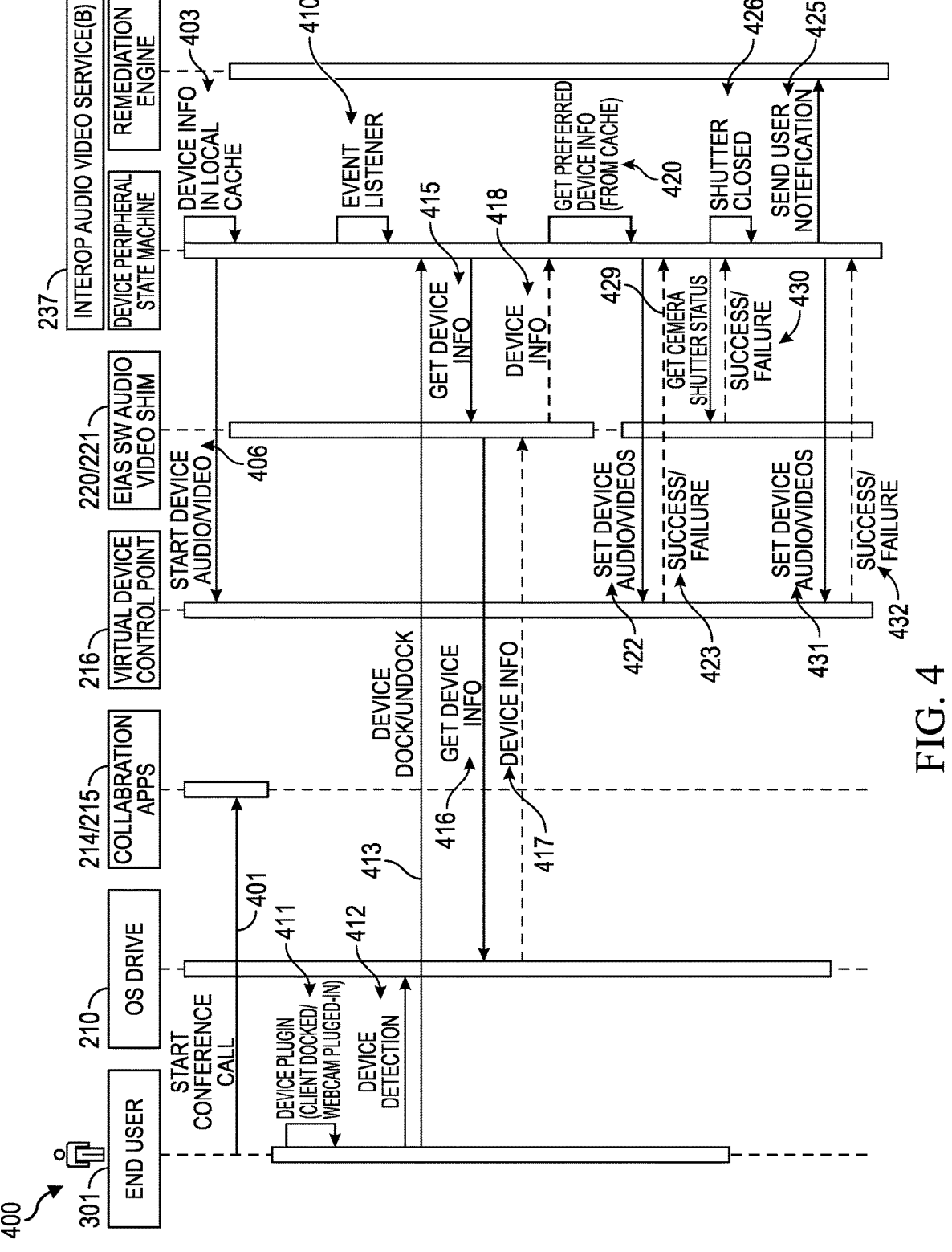
FIG. 4 depicts a sequence diagram of an example of a method for providing seamless switching of A/V devices in response to a device dock or undock workspace state change during a collaboration, with an external camera shutter closed, according to some embodiments.

FIG. 4 depicts a sequence diagram of an example of a method for providing seamless switching of A/V devices in response to a device dock or undock workspace state change during a collaboration, and with an external camera shutter closed. In various embodiments, method 400 may be performed, at least in part, by one or more components shown in the system of FIG. 2. Particularly, at 401 a user 301 operates collaboration application(s) 214/215 to start a collaboration session (e.g., a conference call).

Meanwhile, at 403, the device/peripheral state machine of the interop A/V service 237 maintains A/V device information collected using method 300. Interop A/V service 237 monitors, observes and selects the most appropriate Audio/video device and stores this information in the local cache with the A/V device details. At 406, the device/peripheral state machine of the interop A/V service 237 sends a command to A/V shims 220/221 (or directly to the virtual device control points 216) to set a selected A/V device for use during the session. For example, the initial A/V devices may be selected based upon context information and/or user preferences. Then, the A/V shims 220/221 send the set A/V device command to the virtual device control points 216. The virtual device control points 216 might then send the command to collaboration application(s) 214/215 (not shown). The collaboration application(s) 214/215 starts the collaboration session using the set A/V devices.

Virtual device control points 216 and/or A/V shims 220/221 may enumerate and create virtual device handles for each A/V device that are usable for mapping the actual physical devices. The interop A/V service 237 can set up the default audio and video devices to the virtual device handles created by the virtual device control points 216 and/or A/V shims 220/221. In addition, interop A/V service 237 can query the A/V device handles from the local cache based on the discovery, and can associate the most appropriate audio and the video devices to the virtual handle using the virtual device control points 216. For example, a USB webcam handle and an integrated audio handle can be associated with the virtual device handles. As such, when receiving or processing audio signals or video frames, collaboration application(s) 214/215 may use generic, virtual device handles rather than referring to specific physical devices. In some cases, collaboration application(s) 214/215 may receive audio or video data from different A/V device(s) using a same virtual device handle.

At 410, the device/peripheral state machine of the interop A/V service 237 starts listening for system state change events and/or for device or function failure events. System state change events can be, for example, docking the IHS, undocking the IHS, opening a lid of the IHS, closing the lid of the IHS, connecting peripherals from the IHS, disconnecting peripherals from the IHS, or camera shutter controls opening or closing, etc. Function failure events can be due to a device firmware failure, or a shutter of a camera being closed, during a collaboration session, for example.

During a system state change, such as those mentioned in hypothetical scenarios 1, 2 and 3, the device/peripheral state machine of the interop A/V service 237 gets a trigger for IHS state change. On receiving the trigger for the state change event, the interop A/V service 237 disconnects the audio/video device from the virtual device handle using the virtual device control point APIs 216. The interop A/V service 237 queries for the most appropriate Audio/Video device from the local cache. The interop A/V service 237 then programs the association of the most appropriate audio/video device to the virtual device handle using the virtual device control point APIs 216. The notification engine of the interop A/V service 237 can then notify the user on the change in Audio/Video device association.

More particularly, at 411, user 301 docks IHS 100 or plugs an A/V device (e.g., webcam, etc.) into IHS 100. At 412, the OS drivers 210 detect the docking of the IHS or the plugging in of the A/V device. At 413, OS drivers 210 send a device dock/undock or a device plug/unplug message to the audio/video shims (220/221), which sends the device dock/undock or device plug/unplug event to the device/peripheral state machine of the interop A/V service 237.

Upon receiving the device dock/undock or device plug/unplug event, the device/peripheral state machine of the interop A/V service 237 checks for device information at 415 with A/V shims 220/221. At 416, A/V shims 220/221 get device information from the OS drivers 210. At 417, the OS drivers 210 return device information to A/V shims 220/221, and at 418 A/V shims 220/221 forward the device information to the device/peripheral state machine of the interop A/V service 237. At 420, the device/peripheral state machine of the interop A/V service 237 gets a preferred device info from the local cache.

At 422, the device/peripheral state machine of the interop A/V service 237 sets the new A/V device info with A/V shims 220/221, and the A/V shims 220/221 send the set command to virtual device control points 216. At 423, virtual device control points 216 sends a success or failure message to A/V shims 220/221, and the A/V shims 220/221 forward the message to the device/peripheral state machine of the interop A/V service 237.

Then at 429, the device/peripheral state machine of the interop A/V service 237 can get a shutter status from the A/V shims 220/221. At 430 the A/V shims 220/221 returns information regarding whether the shutter is open or closed, such as a success/failure message, to the device/peripheral state machine of the interop A/V service 237. At 426, the device/peripheral state machine of the interop A/V service 237 determines that the shutter is closed. At 425, the device/peripheral state machine of the interop A/V service 237 can provide a notification to the notification engine, which can send a notification to the user that the shutter of the camera is closed. The device/peripheral state machine of the interop A/V service 237 can also provide a notification to the remediation engine, which can define remediations for A/V devices. For example, the remediation engine can determine the next preferred A/V device to switch to, when the shutter of the camera is closed.

If it is determined that a new A/V device should be switched to, then at 431, the device/peripheral state machine of the interop A/V service 237 sets the new A/V device info with A/V shims 220/221, and the A/V shims 220/221 send the set command to virtual device control points 216. At 432, virtual device control points 216 sends a success or failure message to A/V shims 220/221, and the A/V shims 220/221 forward the message to the device/peripheral state machine of the interop A/V service 237.

As a result, if the failed A/V device (e.g., the webcam camera whose shutter is closed) has been mapped to the virtual device handle being used during the collaboration session, interop A/V service 237 disconnects the physical A/V device from the virtual device handle, and then programs or re-maps a new association of A/V device to the same virtual device handle using the virtual device control points 216's APIs, without having to notify collaboration applications 214/215 and/or in the absence of user input. In some cases, interop A/V service 237 may select a new physical A/V device to be associated with the device handle based, at least in part, upon previously selected user preferences and/or based upon contextual information.

Examples of contextual information usable by interop A/V service 237 to select a new A/V device and to re-map it to the virtual device handle may include, but are not limited to: an application type or ID (e.g., video conferencing, audio conferencing, etc.), whether the application is being executed in the foreground or background, a position or distance of the user relative to the IHS, a position or distance of the user relative to the failed or other A/V device, the user's gaze direction or face angle, a user ID, a type or importance of the collaboration session, a role of the user in the collaboration session (e.g., speaker, listener, participant, host, etc.), an IHS location, a battery charge level, an AC power availability, a utilization level of a component of the IHS (e.g., processor, memory, etc.), a temperature of the IHS, a posture of the IHS (e.g., tablet mode or laptop mode), an ambient noise level, an ambient light level, etc.

Figure 5:
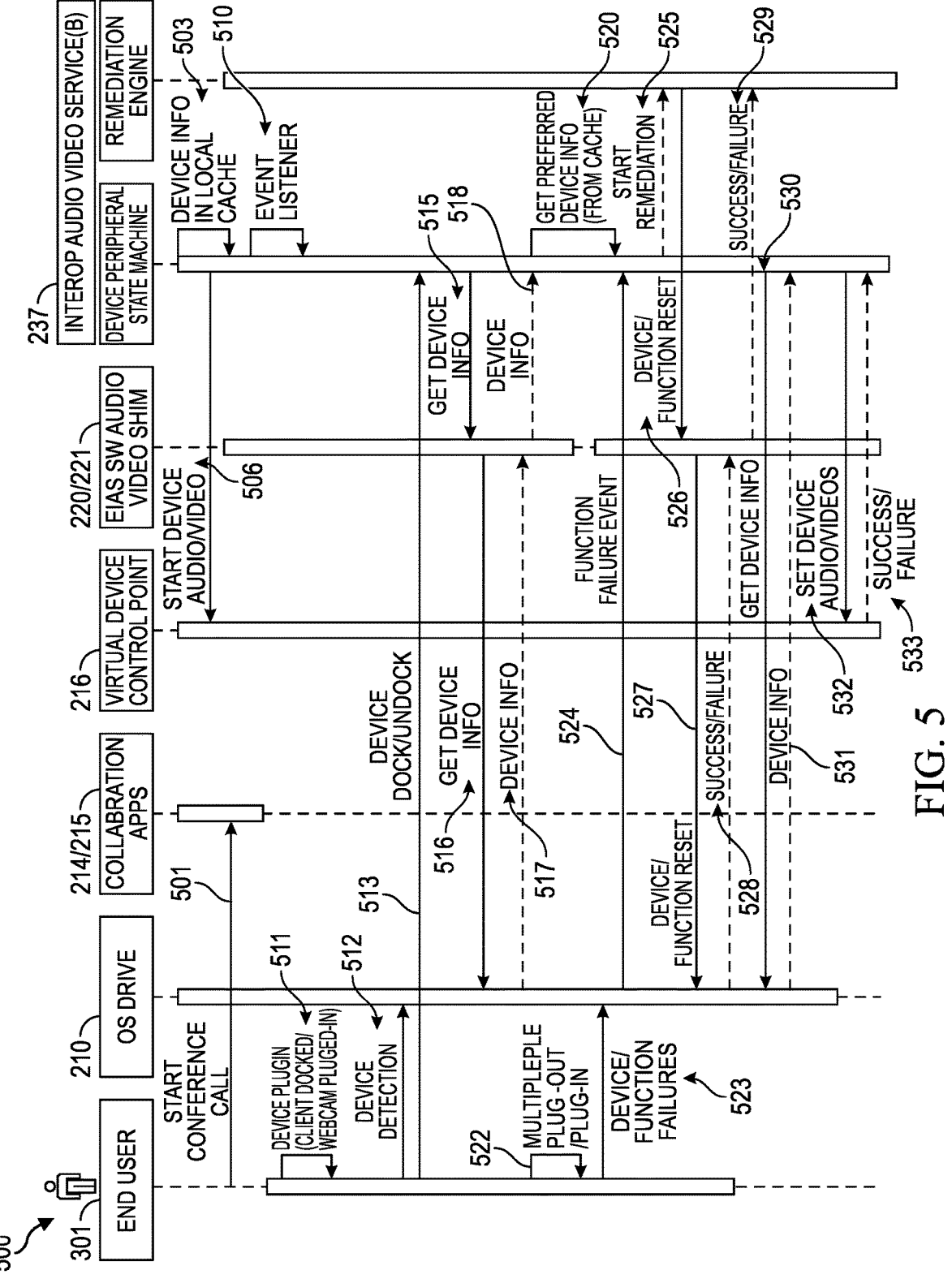
FIG. 5 depicts a sequence diagram of an example of a method for providing seamless switching of A/V devices in response to a device or function failure during a collaboration application session, according to some embodiments.

FIG. 5 depicts a sequence diagram of an example of a method for providing seamless switching of A/V devices in response to a device or function failure during a collaboration application session, according to some embodiments. In various embodiments, method 500 may be performed, at least in part, by one or more components shown in the system of FIG. 2. Particularly, at 501 a user 301 operates collaboration application(s) 214/215 to start a collaboration session (e.g., a conference call).

Meanwhile, at 503, the device/peripheral state machine of the interop A/V service 237 maintains A/V device information collected using method 300. Interop A/V service 237 monitors, observes and selects the most appropriate Audio/video device and stores this information in the local cache with the A/V device details. At 506, the device/peripheral state machine of the interop A/V service 237 sends a command to A/V shims 220/221 (or directly to the virtual device control points 216) to set a selected A/V device for use during the session. For example, the initial A/V devices may be selected based upon context information and/or user preferences. Then, the A/V shims 220/221 send the set A/V device command to the virtual device control points 216. The virtual device control points 216 might then send the command to collaboration application(s) 214/215 (not shown). The collaboration application(s) 214/215 starts the collaboration session using the set A/V devices.

Virtual device control points 216 and/or A/V shims 220/221 may enumerate and create virtual device handles for each A/V device that are usable for mapping the actual physical devices. The interop A/V service 237 can set up the default audio and video devices to the virtual device handles created by the virtual device control points 216 and/or A/V shims 220/221. In addition, interop A/V service 237 can query the A/V device handles from the local cache based on the discovery, and can associate the most appropriate audio and the video devices to the virtual handle using the virtual device control points 216. For example, a USB webcam handle and an integrated audio handle can be associated with the virtual device handles. As such, when receiving or processing audio signals or video frames, collaboration application(s) 214/215 may use generic, virtual device handles rather than referring to specific physical devices. In some cases, collaboration application(s) 214/215 may receive audio or video data from different A/V device(s) using a same virtual device handle.

At 510, the device/peripheral state machine of the interop A/V service 237 starts listening for system state change events and/or for device or function failure events. System state change events can be, for example, docking the IHS, undocking the IHS, opening a lid of the IHS, closing the lid of the IHS, connecting peripherals from the IHS, disconnecting peripherals from the IHS, or camera shutter controls opening or closing, etc. Function failure events can be due to a device firmware failure, or a shutter of a camera being closed, during a collaboration session, for example.

During a system state change, such as those mentioned in hypothetical scenarios 1, 2 and 3, the device/peripheral state machine of the interop A/V service 237 gets a trigger for IHS state change. On receiving the trigger for the state change event, the interop A/V service 237 disconnects the audio/video device from the virtual device handle using the virtual device control point APIs 216. The interop A/V service 237 queries for the most appropriate Audio/Video device from the local cache. The interop A/V service 237 then programs the association of the most appropriate audio/video device to the virtual device handle using the virtual device control point APIs 216. The notification engine of the interop A/V service 237 can then notify the user on the change in Audio/Video device association.

More particularly, at 511, user 301 docks IHS 100 or plugs an A/V device (e.g., webcam, etc.) into IHS 100. At 512, the OS drivers 210 detect the docking of the IHS or the plugging in of the A/V device. At 513, OS drivers 210 send a device dock/undock or a device plug/unplug message to the audio/video shims (220/221), which sends the device dock/undock or device plug/unplug event to the device/peripheral state machine of the interop A/V service 237.

Upon receiving the device dock/undock or device plug/unplug event, the device/peripheral state machine of the interop A/V service 237 checks for device information at 515 with A/V shims 220/221. At 516, A/V shims 220/221 get device information from the OS drivers 210. At 517, the OS drivers 210 return device information to A/V shims 220/221, and at 518 A/V shims 220/221 forward the device information to the device/peripheral state machine of the interop A/V service 237. At 520, the device/peripheral state machine of the interop A/V service 237 gets a preferred device info from the local cache.

Meanwhile, at 522, an end user causes the IHS to undergo multiple plug-outs or plug-ins from a docking station, for example. These multiple plug-outs or plug-ins cause a device or function failure. At 523, OS drivers 210 detect a device function failure (e.g., disconnect, low battery, etc.). At 524, OS drivers 210 send a device function failure message to the audio/video shims 220/221, which send the device or function failure event to the device/peripheral state machine of the interop A/V service 237.

At 525, the device/peripheral state machine of the interop A/V service 237 sends a notification to the remediation engine of the interop A/V service 237 to start a remediation. Upon receiving the remediation notification, the remediation engine of the interop A/V service 237, at 526, provides a device/function reset event to the A/V shims 220/221. At 527, A/V shims 220/221 provide the device/function reset event to the OS drivers 210. At 528, the OS drivers 210 provide a success or failure notification for an attempted device/function reset to the A/V shims 220/221, and at 529 A/V shims 220/221 forward the success or failure notification for the attempted device/function reset to the remediation engine of the interop A/V service 237.

If the device/function was not successfully reset, then the device/peripheral state machine of the interop A/V service 237 checks for device information at 530 with A/V shims 220/221, where the A/V shims 220/221 get device information from the OS drivers 210. At 531, the OS drivers 210 return device information to A/V shims 220/221, and the A/V shims 220/221 forward the device information to the device/peripheral state machine of the interop A/V service 237. The device/peripheral state machine of the interop A/V service 237 then gets a preferred device info from the local cache.

If it is determined that a new A/V device should be switched to, then at 532, the device/peripheral state machine of the interop A/V service 237 sets the new A/V device info with A/V shims 220/221, and the A/V shims 220/221 send the set command to virtual device control points 216. At 433, the virtual device control points 216 sends a success or failure message to A/V shims 220/221, and the A/V shims 220/221 forward the message to the device/peripheral state machine of the interop A/V service 237.

As a result, if the failed A/V device has been mapped to the virtual device handle being used during the collaboration session, interop A/V service 237 disconnects the physical A/V device from the virtual device handle, and then programs or re-maps a new association of A/V device to the same virtual device handle using the virtual device control points 216's APIs, without having to notify collaboration applications 214/215 and/or in the absence of user input. In some cases, interop A/V service 237 may select a new physical A/V device to be associated with the device handle based, at least in part, upon previously selected user preferences and/or based upon contextual information.

In some cases, interop A/V service 237 may notify the user of the change through the notification engine. In some cases, if the failed A/V device is not currently mapped to the virtual device handle, interop A/V service 237 updates the device state in the local cache.

As such, systems and methods described herein enable the seamless switching of A/V devices across different collaboration applications and/or other A/V applications (whether OS-based, web apps, etc.) using a scalable architecture with an application-agnostic translation layer that detects workspace state transitions and switches to the most appropriate A/V devices, with the proper configuration, with low latency, and with little or no intrusion upon the user's experience.

These systems and methods address problems such as audio disconnect, video disconnect, call disconnect, session freeze that can otherwise plague collaboration sessions by enforcing predictable behaviors and that enable users to have seamless switching of A/V devices during their session without hampering ongoing sessions by any collaboration application. In some cases, these systems and methods may be scaled using a cloud service control point in communication with the user's IHS.

In many implementations, systems and methods described herein may be incorporated into a wide range of electronic devices including, for example, computer systems or Information Technology (IT) products such as servers, desktops, laptops, memories, switches, routers, etc.; telecommunications hardware; consumer devices or appliances such as mobile phones, tablets, wearable devices, IoT devices, television sets, cameras, sound systems, etc.; scientific instrumentation; industrial robotics; medical or laboratory electronics such as imaging, diagnostic, or therapeutic equipment, etc.; transportation vehicles such as automobiles, buses, trucks, trains, watercraft, aircraft, etc.; military equipment, etc. More generally, these systems and methods may be incorporated into any device or system having one or more electronic parts or components.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks. The program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
a processor; and
a memory coupled to the processor, the memory having program instructions stored thereon that, upon execution, cause the IHS to:
   detect, by an interoperability service during a collaboration session facilitated by a collaboration application, an indication of a workspace state transition corresponding to a change in availability of audio or video devices, wherein the collaboration application is configured to receive, via a device handle, audio or video data from a first audio or video device that uses a first media framework; and
   in response to the workspace state transition, map a second audio or video device that uses a second media framework to the device handle, wherein the collaboration application is configured to receive the audio or video data from the second audio or video device via the device handle;
   wherein the interoperability service is configured to determine whether to map the second audio or video device to the device handle in response to detecting the indication of the workspace state transition, and wherein a shim service manages the device handle to normalize the first media framework and the second media framework to a standard protocol.

2. The IHS of claim 1, wherein the first audio or video device comprises at least one of: an integrated camera or an external camera.

3. The IHS of claim 1, wherein the first audio or video device comprises at least one of: an integrated microphone, an external microphone, an integrated speaker, or an external speaker.

4. The IHS of claim 1, wherein the different second audio or video device is mapped to the device handle in the absence of notification to the collaboration application.

5. The IHS of claim 1, wherein the different second audio or video device is mapped to the device handle in the absence of any user input request.

6. The IHS of claim 1, wherein the workspace state transition comprises a device function failure.

7. The IHS of claim 6, wherein the device function failure comprises a shutter of a camera being closed while the device is powered and actively connected to the IHS, during the collaboration session.

8. The IHS of claim 1, wherein the program instructions, upon execution, cause the IHS to select the different audio or video device based, at least in part, upon a user's preference.

9. The IHS of claim 1, wherein the workspace state transition comprises an IHS docking or undocking.

10. The IHS of claim 1, wherein the workspace state transition comprises at least one of: an unplugging of the audio or video device from the IHS or a plugging of the different audio or video device into the IHS.

11. The IHS of claim 1, wherein the workspace state transition comprises a power or battery event.

12. The IHS of claim 1, wherein the workspace state transition comprises a change in utilization of a component of the IHS.

13. The IHS of claim 1, wherein the workspace state transition comprises at least one of: a change of location of the IHS, a change of position of a user relative to the IHS, a change of position of the user relative to the audio or video device, a change of position of the user relative to the different audio or video device, or a change in the user's gaze or face angle.

14. The IHS of claim 1, wherein the workspace state transition comprises a change of a role of a user during the collaboration session, and wherein the change of the role of the user comprises a change from the user being a host to the user being a non-host during the collaboration session, or from the user being a non-host to the user being a host during the collaboration session.

15. A method, comprising:
detecting, by an interoperability service, an indication of a change in availability of one or more audio or video devices during a collaboration session executed by a collaboration application, wherein the collaboration application is configured to receive, via a device handle, audio or video data from a first audio or video device that uses a first media framework; and
in response to the detected change in availability, mapping a second audio or video device that uses a second media framework to the device handle without notifying the collaboration application, wherein the collaboration application is configured to receive the audio or video data from the second audio or video device using the device handle;
wherein the interoperability service is configured to determine whether to map the second audio or video device to the device handle in response to detecting the indication of the change in availability, and wherein a shim service manages the device handle to normalize the first media framework and the second media framework to a standard protocol.

16. The method of claim 15, wherein the change in availability comprises a shutter of a camera being closed while the camera is powered and active, during the collaboration session.

17. A memory storage device having program instructions stored thereon that, upon execution by an Information Handling System (IHS), cause the IHS to:

detect, by an interoperability service, an indication of a workspace state transition during a collaboration session provided by a collaboration application, wherein the collaboration application is configured to receive audio or video data from a first audio or video device using a device handle, wherein the first audio or video device uses a first media framework; and in response to the workspace state transition, map a second audio or video device that uses a second media framework to the device handle without notification to the collaboration application, wherein the collaboration application is configured to receive the audio or video data from the second audio or video device using the device handle;

wherein the interoperability service is configured to determine whether to map the second audio or video device to the device handle in response to detecting the indication of the workspace state transition, and wherein a shim service manages the device handle to normalize the first media framework and the second media framework to a standard protocol.

18. The memory storage device of claim 17, wherein the workspace state transition comprises one or more of: docking the IHS; undocking the IHS; opening a lid of the IHS; closing the lid of the IHS; connecting peripherals from the IHS; disconnecting peripherals from the IHS; or a device function failure.

\* \* \* \* \*